US011108784B2

(12) United States Patent
Fincannon et al.

(10) Patent No.: US 11,108,784 B2
(45) Date of Patent: Aug. 31, 2021

(54) PERMISSION AGGREGATOR

(71) Applicant: ADP, LLC, Roseland, NJ (US)

(72) Inventors: Gregory Fincannon, Alpharetta, GA (US); Stephen Dale Garvey, Alpharetta, GA (US); Christian Brunkow, Alpharetta, GA (US); Haritha Maddi, Alpharetta, GA (US)

(73) Assignee: ADP, INC., Roseland, NJ (US)

( * ) Notice: Subject to any disclaimer, the term of this patent is extended or adjusted under 35 U.S.C. 154(b) by 308 days.

(21) Appl. No.: 16/407,554

(22) Filed: May 9, 2019

(65) Prior Publication Data

US 2020/0358785 A1 Nov. 12, 2020

(51) Int. Cl.
*H04L 29/06* (2006.01)
*H04L 9/32* (2006.01)

(52) U.S. Cl.
CPC .......... *H04L 63/108* (2013.01); *H04L 9/3297* (2013.01); *H04L 63/102* (2013.01); *H04L 63/105* (2013.01)

(58) Field of Classification Search
CPC ... H04L 63/108; H04L 9/3297; H04L 63/102; H04L 63/105
See application file for complete search history.

(56) References Cited

U.S. PATENT DOCUMENTS

| | | | |
|---|---|---|---|
| 8,713,056 B1 * | 4/2014 | Wongkar | H04L 63/0281 707/786 |
| 9,300,646 B1 * | 3/2016 | Saylor | H04L 63/107 |
| 9,338,157 B1 * | 5/2016 | Vazquez | H04L 63/08 |
| 9,923,927 B1 * | 3/2018 | McClintock | H04L 63/108 |
| 10,270,759 B1 * | 4/2019 | Bordelon | G06F 21/33 |
| 2005/0044426 A1 * | 2/2005 | Vogel | G06F 21/6218 726/19 |
| 2006/0156021 A1 * | 7/2006 | Minium | H04L 63/102 713/182 |
| 2009/0271844 A1 * | 10/2009 | Zhang | G06F 12/1458 726/2 |
| 2010/0318569 A1 * | 12/2010 | Munday | G06F 21/6227 707/783 |
| 2017/0053130 A1 * | 2/2017 | Hughes | G16H 10/60 |
| 2017/0163651 A1 * | 6/2017 | Povalyayev | G06F 16/27 |
| 2017/0344481 A1 * | 11/2017 | Pack, III | G06F 16/00 |
| 2017/0346804 A1 * | 11/2017 | Beecham | H04L 63/083 |
| 2017/0346830 A1 * | 11/2017 | Goldfarb | H04L 63/102 |
| 2018/0183801 A1 * | 6/2018 | Viswanath | H04L 63/101 |

* cited by examiner

*Primary Examiner* — Harris C Wang
(74) *Attorney, Agent, or Firm* — Patrick J. Daugherty; Daugherty & Del Zoppo, Co.LPA

(57) ABSTRACT

Aspects refresh permission credentials by populating within user profile data sets cached for members an invalidated value and a first timestamp of said populating the invalidated value; selecting user profile data sets including the invalidated value; identifying a second timestamp of time of creation of the permission credential within the selected user profile data sets; and in response to determining that a time elapsed between the first and second timestamps does not exceed a threshold, rebuilding the selected user profile data sets to include an updated value of the permission credential and set the second timestamp value to a current time of the rebuild, and cache (store) the rebuilt selected user profile data set within the repository.

20 Claims, 2 Drawing Sheets

PERMISSION AGGREGATOR

BACKGROUND

Human resource management (sometimes "HRM" or "HR") generally refers to functions and systems deployed in organizations that are designed to facilitate or improve employee, member or participant performance in service of strategic objectives. HR comprehends how people are identified, categorized and managed within organizations via a variety of policies and systems. Human Resource management systems may span different organization departments and units with distinguished activity responsibilities. Human Resource Information Systems (HRIS) comprehend information technology (IT) systems and processes configured and utilized in the service of HR, and HR data processing systems which integrate and manage information from a variety of different applications and databases.

Organizations may implement multiple HR systems that have different, specific objectives and permissions for a given, authenticated user. Once a user has been logged in and been authenticated, the HR system must determine the authorizations, permissions that the authenticated user has within the system: for example, to view a paycheck, clock in or clock out, etc. For example, permissions and credentials for access of a user to a first HR system of the organization may be managed and stored in the first HR system, while a different set of permissions and credentials for the user for access to a different, second HR system of the organization may be managed and stored in the second HR system. Other, user-facing applications, such as mobile applications, may need to span both the first and second systems in order to determine (display, etc.) access of the user to services of the organization. This functionality generally requires that the user-facing application determine or arbitrate different permissions and credentials for the user for access to each system in a timely fashion in order to satisfy user or system performance requirements or expectations. Otherwise, the user engaging the user-facing application may experience unacceptable performance delays.

SUMMARY

In one aspect of the present invention, a method includes a processor, in response to an event that requires a permission refresh for a permission credential used by each of a plurality of members of an organization to access a service, populating within user profile data sets that are cached in a data repository for each of the members an invalidated value and a first timestamp, wherein values of the first timestamp populated within of each of the user profile data sets include a time of the populating of the invalidated value within each of the user profile data sets; selecting one of the user profile data sets in response to determining that the selected user profile data set comprises the invalidated value; identifying a second timestamp value within the selected user profile data set that includes a time of creation of the permission credential within the selected user profile data set; and in response to determining that a time elapsed between the first timestamp and the second timestamp does not exceed a threshold time value, rebuilding the selected user profile data set by including an updated value of the permission credential within the selected user profile data set and setting the second timestamp value to the current time of the rebuild, and storing the rebuilt selected user profile data set within the repository.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to an event that requires a permission refresh for a permission credential used by each of a plurality of members of an organization to access a service, populates within user profile data sets that are cached in a data repository for each of the members an invalidated value and a first timestamp, wherein values of the first timestamp populated within each of the user profile data sets include a time of the populating of the invalidated value within each of the user profile data sets; selects one of the user profile data sets in response to determining that the selected user profile data set comprises the invalidated value; identifies a second timestamp value within the selected user profile data set that includes a time of creation of the permission credential within the selected user profile data set; and in response to determining that a time elapsed between the first timestamp and the second timestamp does not exceed a threshold time value, rebuilds the selected user profile data set by including an updated value of the permission credential within the selected user profile data set and setting the second timestamp value to the current time of the rebuild, and stores the rebuilt selected user profile data set within the repository.

In another aspect, a computer program product has a computer-readable storage medium with computer readable program code embodied therewith. The computer readable program code includes instructions for execution which cause the processor to, in response to an event that requires a permission refresh for a permission credential used by each of a plurality of members of an organization to access a service, populate within user profile data sets that are cached in a data repository for each of the members an invalidated value and a first timestamp, wherein values of the first timestamp populated within of each of the user profile data sets include a time of the populating of the invalidated value within each of the user profile data sets; select one of the user profile data sets in response to determining that the selected user profile data set comprises the invalidated value; identify a second timestamp value within the selected user profile data set that includes a time of creation of the permission credential within the selected user profile data set; and in response to determining that a time elapsed between the first timestamp and the second timestamp does not exceed a threshold time value, rebuild the selected user profile data set by including an updated value of the permission credential within the selected user profile data set and setting the second timestamp value to the current time of the rebuild, and store the rebuilt selected user profile data set within the repository.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Embodiments of the present invention provide methods, systems, processes and computer-readable storage medium solutions for efficiently and selectively updating cached permission entries for members (associates, users, clients, customers, etc.) of a large organization. Embodiments selectively and dynamically balance allocations between sets of cache entries that are proactively rebuilt versus other sets of cache entries that are invalidated and then rebuilt when requested, wherein the respective selections are made as a function of time and member quantity attributes of each organization.

A user or member profile is a cached aggregation of a variety of permissions that the user has across different systems within an organization. Generally, cached permissions for members of an organization must be updated or refreshed across an entire group of members in response to certain event occurrences. For example, when an organization purchases or implements a new product, member permissions cached for each individual member must be updated so that the members gain access to functionality provided by the new product. As some organizations have large numbers of members (for example, hundreds of thousands), it is generally inefficient with respect to available time and personnel resources to proactively update all of the cached permissions for all of the members before the member needs (applies for or calls for) the permissions without negative impacts on system performance, expanding significant amounts of resources, or incurring large costs.

Figure 1:
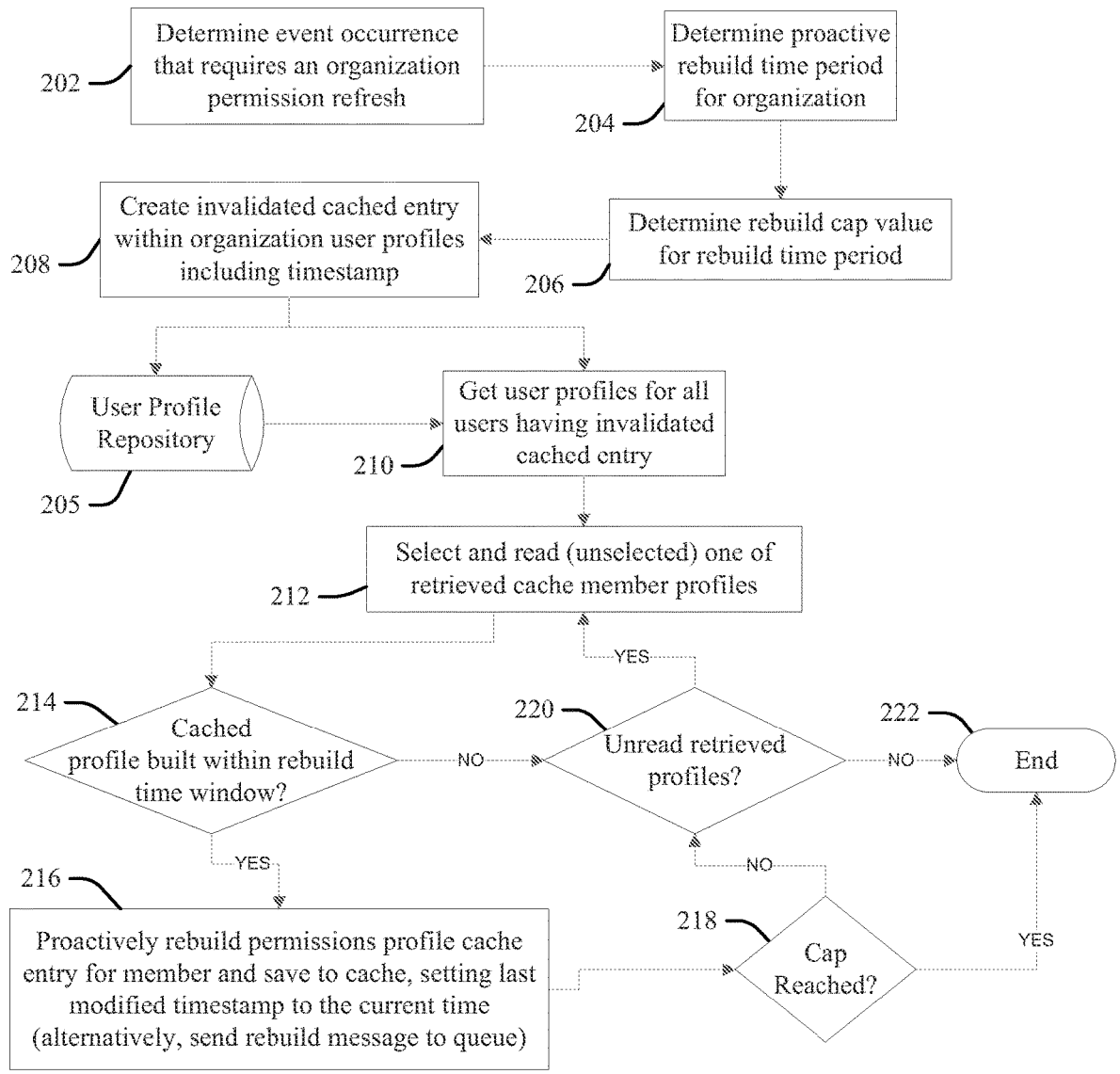
FIG. 1 is a flow chart illustration of a method or process aspect according to an embodiment of the present invention.

FIG. 1 illustrates an embodiment according to the present invention. In response to determining at 202 that an organization event has occurred that requires a permission refresh for each member of the organization (for example, purchase of a new cloud service), at 204 a processor configured according to the present invention (the "configured processor") invokes (executes) an Application Programming Interface (API) call and thereby determines (identifies, retrieves, etc.) a proactive rebuild time period (window) that is designated or appropriate for the organization (for example, 24 hours, ten days, two weeks, one month, etc.). The rebuild time period is selected or determined to differentiate members into two categories: a first "proactive rebuild" category of frequent users (those for whom their permissions cache entry was last rebuilt within the defined or determined time window) that are designated for expenditure of resources to proactively rebuild their cache entry permissions before the members need or request the permissions; and a second "invalidation" category of the remaining other, less-frequent users (those for whom their permissions cache entry have not been rebuilt within this time window) that are designated to be invalidated and rebuilt when requested, as more fully described below. By focusing on frequent users, embodiments expend resources on those members most likely to benefit from a proactive rebuild, while saving the cost and expense of rebuilding profile for the less-frequent users, deferring this cost as the less-frequent user are not as likely to call for the new permissions relative to the frequent users.

At 204 embodiments retrieve a value for specified proactive rebuild time period (from a data storage or network resource) or determine the value as a function of attributes of the organization: illustrative but not exhaustive examples of organization attributes include total numbers of members, numbers of permission requests by members or frequency thereof, computer or cloud resources, capacities and performance characteristics allocated or available to the organization and their associated costs, and still others will be apparent to one skilled in the art.

At 206 the configured processor determines (identifies, retrieves, etc.) a maximum rebuild threshold or cap value for a total number of user profiles of the first "proactive rebuild" category of members that should be rebuilt during the rebuild time period (for example, one thousand, 10,000, etc.). Thus, the configured processor retrieves a value for rebuild cap (from a data storage or network resource) or determines the value as a function of attributes of the organization.

At 208 the configured processor creates (populates) within user profile data sets cached (stored) in a data repository 205 (memory device, cloud service or resource, etc.) for each of the organization members an "invalidated" entry value, and a timestamp of the time of said invalidated value population/creation. The invalidated entry value generally signifies to the embodiment that the cached permissions for each member are invalid with respect to acquiring service permissions authorizations.

At 210 the configured processor gets (identifies through an API call, etc.) the user profiles for all users having the "invalidated" cached entry (created at 208). Some embodiments may get the user profiles by scanning an entirety of cache data. In alternative embodiments, performance and resource efficiencies are accomplished by reading an index cache entry that stores unique identifiers ("ID's") for each associate of the organization that have been cached, wherein the organization is part of the index key, and the index cache entry is built by an offline process that runs periodically to scan the entire cache. Further efficiencies are accomplished by scheduling the offline process to run during low-demand time periods, for example, nightly after business hours, or on weekends of a work-week, in part as it not generally critical for the index to be completely up to date in order to perform adequately in meeting the objective of the embodiments.

At 212 the configured processor selects and reads one of the cached member profiles retrieved at 210, and at 214 determines whether an elapsed time from a timestamp of creation of the read cached profile (a last-modified timestamp value) until the timestamp of the invalidation entry exceeds the rebuild time period, and thus, whether the read cached profile was built or modified within the proactive rebuild time window (the elapsed time does not exceed the proactive rebuild time window period) or outside of the proactive rebuild time window (the elapsed time exceeds the proactive rebuild time window period).

In response to determining at 214 that the read cached profile was built within the proactive rebuild time window, at 216 the configured processor proactively rebuilds the permissions profile cache entry for the member and saves it to the cache, setting the last modified timestamp to the current time of the rebuild. In some embodiments rebuilding at 216 is performed asynchronously, including sending a rebuild message to a queue, wherein the configured processor arbitrates the rebuild determination with other queued rebuild orders or requests. In some embodiments the queue has differential priorities: for example, a proactive rebuild message generated at 216 has a lower priority value relative to a queued rebuild executing or scheduled in response to reading an invalidated cache entry value from cached permissions of a member presently trying to access services.

Otherwise, in response to determining at 214 that the read cached profile was built outside of the proactive rebuild time window, at 220 the configured processor determines whether any of the member profiles retrieved at 210 remain unselected and unread, and if so, returns to 212 to select and read a next one of said profiles. In response to determining at 220 that no more retrieved profiles remain unselected and unread, the configured processor ends the present process at 222.

After proactively rebuilding the profile at 216, at 218 the configured processor determines whether a total number of proactive cache rebuilds executed or queued at 216 exceeds the maximum rebuild cap determined at 206 (for example, incrementing a counter with each rebuild at 216 and comparing the counter to a threshold cap value at 218): if so, the configured processor ends the present process at 222; and if not, the configured processor returns to 220.

Thus, embodiments set or select the rebuild time period to differentiate members into two categories: a first "proactive rebuild" category of frequent users (those for whom their permissions cache entry was last rebuilt within the defined or determined time window) that are designated for expending resources for a proactive rebuild of their cache entry permissions; and a second "invalidated" category of the remaining other, less-frequent users (those for whom their permissions cache entry have not been rebuilt within this time window), wherein their cache rebuilds are deferred until either all the more-frequent members have their profiles rebuilt, or until such time as they call for the new permissions, wherein the embodiments will trigger rebuilds of the permissions in response to finding the "invalidated" value within their cached permissions. More particularly, when a request is made for a member (associate) permission for this second grouping, the profile comprising the "invalidated" value is treated as deleted and a new associate permissions cache entry is built. This grouping may also include frequent-user members who request permissions or associated service before their permissions cache entry can be proactively rebuilt at 216. Thus, for any member who logs in within the rebuild time window the system will add them to the queue at 210 to proactively rebuild their user profile, so that when they login next time they will immediately get the updates; in contrast for those who have logged in outside of the time window, they will still get the updates, but it will take longer, because the user profile will also be rebuilt at that time.

Embodiments may also determine the rebuild time window and rebuild cap values dynamically set at runtime at 204 and 206, as a function of organization or resource attributes or costs, including through feedback processes: for example, continually updating either of the values at 212 based on the number of proactive rebuilds that are waiting (queued) to be processed, available bandwidth, current cost values, etc.

Embodiments provide data processing and resource allocation advantages over prior art methods and systems. At the moment that the "invalidated" cache entry is created, all user profiles are invalidated for that client. However, in contrast to the cost involved with rebuilding all user profiles under the prior art in response to a refresh event, the present embodiment limit the cost and resource expenditure to a subset of the entirety of the members (and thus proportionately reducing the costs, etc. relative to the prior art), through the modest cost of implementing one additional check when each user logs in: to determine if the member has a cached user profile with a last-modified timestamp that is before the creation timestamp of the global invalidated entry if one exists, and if so, to treat the cached user profile as invalid and rebuild it.

Using a global invalidated cache entry for an organization as described herein eliminates the need to set an invalidated value on each cached profile for a member within the organization, because the global invalidated cache entry has a timestamp for when it was created and each cached user profile has a timestamp for when it was last updated (modified, created, etc.). Thus, if a user profile last-updated time stamp is not after the global invalidated cache entry timestamp then the user profile is invalid; otherwise, it is valid. Proactive rebuilds for the selected, frequent-user subset may still take time (for example, 10,000 members of an entirety of 350,000), and if one of the selected group logs in while the proactive rebuild process is iterating through the group (until meeting the cap value at 218, or otherwise completing the proactive rebuilds), embodiment still provide an updated user profile (in response to reading the "invalidated" value). As the rebuild at 216 will update the last-modified timestamp, this prevents embodiments from rebuilding the user profile twice, avoiding inefficiencies.

Figure 2:
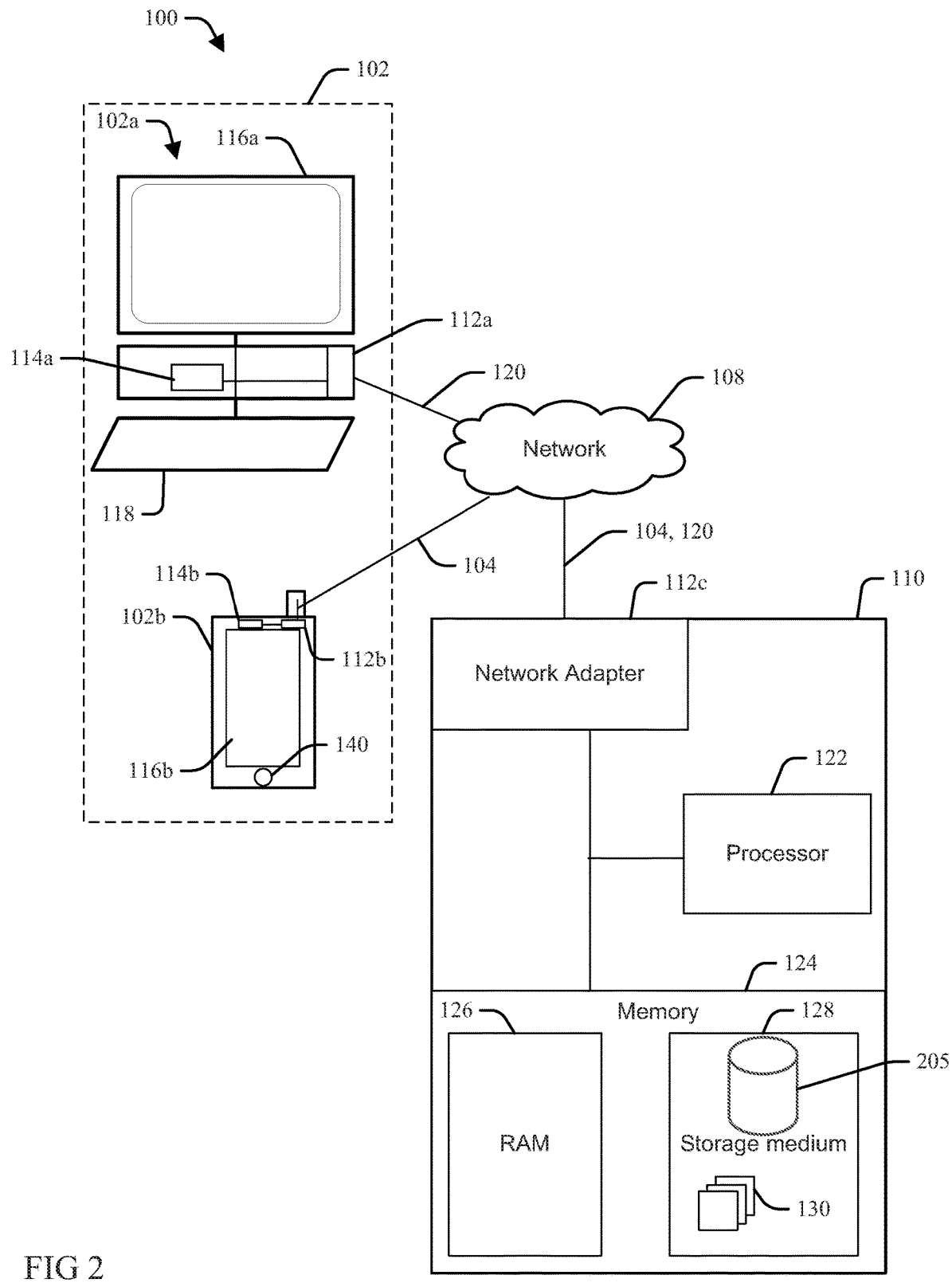
FIG. 2 is a graphic illustration of an example of another implementation according to an embodiment of the present invention.

FIG. 2 is a schematic, graphic illustration of an embodiment of a system 100 for autonomous employability determination processes pursuant to a process or system of FIG. 1. The system 100 includes one or more local computing devices 102, such as, for example, a desktop computer 102a or smartphone 102b, or a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In the present example, the smartphone 102b transfers a request 104 by an organization member for permission to access a service (such as input by the member through a GUI display device 116b) over a network 108 to a computer server 110 via their respective network interface adapters 112b and 112c. The computer server 110 includes a processor 122 configured (thus, the "configured processor" discussed above with respect to FIG. 1) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer readable memory 126 and a computer readable storage medium 128.

As described above with respect to FIG. 1, the computer server 110, in response to receiving the request 104 reviews a user profile data set of the member cached within the repository 205 and instigates via instructions 120 over the network 108 to the local computing device 102a via their respective network interface adapters 112c and 112a deleting the user profile data set, building a new member permissions cache entry for the member to comprise an updated value of the permission credential, and storing the new member permissions cache entry within the repository 205.

The computer server 110 also, in response to determining the occurrence of an event that requires a permission refresh for a permission credential used by the organization members to access the service, populates within user profile data sets cached in the data repository 205 for each of the members an invalidated value and a (first) timestamp of the populating of the invalidated value; selects a user profile data set comprises the invalidated value; identifies a (second) timestamp value within the selected user profile data set that comprises a time of creation of the permission credential within the selected user profile data set; and, in response to determining that a time elapsed between the first and second timestamp does not exceed the threshold time value, rebuilds the selected user profile data set by including an updated value of the permission credential within the selected user profile data set, and storing the rebuilt selected user profile data set within the repository cache 205, setting the last-modified timestamp of the rebuilt profile data to the current time of the rebuild.

The local computing devices 102 include one or more input devices 118, such as a keyboard, mouse, microphone, touch screen, etc., and wherein the processor 114a drives display devices 116a to present data values as described above with respect to FIG. 1.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 122c in each device exchange (receive and send) computer readable program instructions from and through the network 108 and, including for storage in or retrieval from the computer readable storage medium 128.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as JAVA, Javascript®C, C #, C++, Python, Cython, F #, PHP, HTML, Ruby, and the like. (JAVASCRIPT is a trademark of Oracle America, Inc., in the United States or other countries.)

The computer readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a service provider may perform process steps of the invention on a subscription, advertising, and/or fee basis. That is, a service provider could offer to integrate computer-readable program code into the computer system 100 to enable the computer system 100 to perform the processes of FIG. 1 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
in response to an event that requires a permission refresh for a permission credential used by each of a plurality of members of an organization to access a service, populating within a plurality of user profile data sets that are cached in a data repository for each of the members an invalidated value and a first timestamp, wherein values of the first timestamp populated within each of the user profile data sets comprise a time of the populating of the invalidated value within each of the user profile data sets;
selecting one of the user profile data sets in response to determining that the selected user profile data set comprises the invalidated value;
identifying a second timestamp value within the selected user profile data set that comprises a time of creation of the permission credential within the selected user profile data set; and
in response to determining that a time elapsed between the first timestamp and the second timestamp does not exceed a threshold time value, rebuilding the selected user profile data set by including an updated value of the permission credential within the selected user profile data set and setting the second timestamp value to a current time of the rebuild, and storing the rebuilt selected user profile data set within the repository.

2. The method of claim 1, further comprising:
in response to a request for access to the service by the first of the members, determining whether a first of the user profile data sets that is associated to the first member comprises the invalidated value; and
in response to determining that the first user profile data set comprises the invalidated value, deleting the first user profile data set, building a new member permissions cache entry for the first member to comprise the updated value of the permission credential, and storing the new member permissions cache entry within the repository for use by the first member to access the service.

3. The method of claim 2, further comprising:
in response to revising the selected user profile data set, incrementing a counter value of a total number of revisions of selected user profile data sets; and
iteratively repeating, until the incremented counter value meets a threshold cap value, the selecting one of the user profile data sets in response to determining that the selected user profile data set comprises the invalidated value, the identifying the second timestamp value within the selected user profile data and the revising the selected user profile data set in response to determining that the time elapsed between the first timestamp and the second timestamp does not exceed the threshold time value.

4. The method of claim 3, further comprising:
determining at least one of the threshold time value and the threshold cap value as a function of a resource attribute that is selected from the group consisting of a total number of the members, a frequency of permission requests by the members, a total number of requests for rebuilding the selected user profile data sets that are queued for processing, a total amount of available bandwidth, and a cost value for rebuilding the total number of requests queued for processing.

5. The method of claim 4, further comprising:
selecting the one of the user profile data sets in response to reading an index cache entry that stores unique identifiers for each of the members for which the user profile data sets are cached within the repository, wherein a unique identifier of the organization is part of an index key.

6. The method of claim 5, further comprising:
building the index cache entry via an offline process that runs periodically to scan an entirety of a cache within the repository.

7. The method of claim 6, further comprising executing via an application programming interface call at least one of the populating the invalidated value and the first timestamp within the user profile data sets cached in the data repository, the selecting one of the user profile data sets in response to determining that the selected user profile data set comprises the invalidated value, and the rebuilding the selected user profile data set.

8. The method of claim 1, further comprising:
integrating computer-readable program code into a computer system comprising the processor, a computer readable memory in circuit communication with the processor, and a computer readable storage medium in circuit communication with the processor; and
wherein the processor executes program code instructions stored on the computer-readable storage medium via the computer readable memory and thereby performs the populating within the plurality of user profile data sets cached in the data repository the invalidated value and the first timestamp, the selecting the one of the user profile data sets in response to determining that the selected user profile data set comprises the invalidated value, the identifying the second timestamp value, and the rebuilding the selected user profile data set.

9. The method of claim 8, wherein the computer-readable program code is provided as a service in a cloud environment.

10. A system, comprising:
a processor;
a computer readable memory in circuit communication with the processor;
a computer readable storage medium in circuit communication with the processor; and
wherein the processor executes program instructions stored on the computer-readable storage medium via the computer readable memory and thereby:
in response to an event that requires a permission refresh for a permission credential used by each of a plurality of members of an organization to access a service, populates within a plurality of user profile data sets that are cached in a data repository for each of the members an invalidated value and a first timestamp, wherein values of the first timestamp populated within each of the user profile data sets comprise a time of the populating of the invalidated value within each of the user profile data sets;
selects one of the user profile data sets in response to determining that the selected user profile data set comprises the invalidated value;
identifies a second timestamp value within the selected user profile data set that comprises a time of creation of the permission credential within the selected user profile data set; and in response to determining that a time elapsed between the first timestamp and the second timestamp does not exceed a threshold time value, rebuilds the selected user profile data set by including an updated value of the permission credential within the selected user profile data set and setting the second timestamp value to a current time of the rebuild, and stores the rebuilt selected user profile data set within the repository.

11. The system of claim 10, wherein the processor executes the program instructions stored on the computer-readable storage medium via the computer readable memory and thereby:
in response to a request for access to the service by the first of the members, determines whether a first of the user profile data sets that is associated to the first member comprises the invalidated value; and
in response to determining that the first user profile data set comprises the invalidated value, deletes the first user profile data set, builds a new member permissions cache entry for the first member to comprise the updated value of the permission credential, and stores the new member permissions cache entry within the repository for use by the first member to access the service.

12. The system of claim 11, wherein the processor executes the program instructions stored on the computer-readable storage medium via the computer readable memory and thereby:
in response to revising the selected user profile data set, increments a counter value of a total number of revisions of selected user profile data sets; and
iteratively repeats, until the incremented counter value meets a threshold cap value, selecting one of the user profile data sets in response to determining that the selected user profile data set comprises the invalidated value, identifying the second timestamp value within the selected user profile data, and revising the selected user profile data set in response to determining that the time elapsed between the first timestamp and the second timestamp does not exceed the threshold time value.

13. The system of claim 12, wherein the processor executes the program instructions stored on the computer-readable storage medium via the computer readable memory and thereby determines at least one of the threshold time value and the threshold cap value as a function of a resource attribute that is selected from the group consisting of a total number of the members, a frequency of permission requests by the members, a total number of requests for rebuilding the selected user profile data sets that are queued for processing, a total amount of available bandwidth, and a cost value for rebuilding the total number of requests queued for processing.

14. The system of claim 13, wherein the processor executes the program instructions stored on the computer-readable storage medium via the computer readable memory and thereby selects the one of the user profile data sets in response to reading an index cache entry that stores unique identifiers for each of the members for which the user profile data sets are cached within the repository, wherein a unique identifier of the organization is part of an index key.

15. The system of claim 14, wherein the processor executes the program instructions stored on the computer-readable storage medium via the computer readable memory and thereby builds the index cache entry via an offline process that runs periodically to scan an entirety of a cache within the repository.

16. The system of claim 15, wherein the processor executes the program instructions stored on the computer-readable storage medium via the computer readable memory and thereby executes via an application programming interface call at least one of populating the invalidated value and the first timestamp within the user profile data sets cached in the data repository, selecting one of the user profile data sets in response to determining that the selected user profile data set comprises the invalidated value, and rebuilding the selected user profile data set.

17. A computer program product, comprising:
a computer readable storage medium having computer readable program code embodied therewith, wherein the computer readable storage medium is not a transitory signal per se, the computer readable program code comprising instructions for execution by a processor that cause the processor to:
in response to an event that requires a permission refresh for a permission credential used by each of a plurality of members of an organization to access a service, populate within a plurality of user profile data sets that are cached in a data repository for each of the members an invalidated value and a first timestamp, wherein values of the first timestamp populated within each of the user profile data sets comprise a time of the populating of the invalidated value within each of the user profile data sets;
select one of the user profile data sets in response to determining that the selected user profile data set comprises the invalidated value;
identify a second timestamp value within the selected user profile data set that comprises a time of creation of the permission credential within the selected user profile data set; and
in response to determining that a time elapsed between the first timestamp and the second timestamp does not exceed a threshold time value, rebuild the selected user profile data set by including an updated value of the permission credential within the selected user profile data set and setting the second timestamp value to a current time of the rebuild, and stores the rebuilt selected user profile data set within the repository.

18. The computer program product of claim 17, wherein the computer readable program code instructions for execution by the processor further cause the processor to:
in response to a request for access to the service by the first of the members, determine whether a first of the user profile data sets that is associated to the first member comprises the invalidated value; and
in response to determining that the first user profile data set comprises the invalidated value, delete the first user profile data set, build a new member permissions cache entry for the first member to comprise the updated value of the permission credential, and store the new member permissions cache entry within the repository for use by the first member to access the service.

19. The computer program product of claim 18, wherein the computer readable program code instructions for execution by the processor further cause the processor to:
in response to revising the selected user profile data set, increment a counter value of a total number of revisions of selected user profile data sets; and
iteratively repeat, until the incremented counter value meets a threshold cap value, selecting one of the user profile data sets in response to determining that the selected user profile data set comprises the invalidated value, identifying the second timestamp value within the selected user profile data, and revising the selected user profile data set in response to determining that the time elapsed between the first timestamp and the second timestamp does not exceed the threshold time value.

20. The computer program product of claim 19, wherein the computer readable program code instructions for execution by the processor further cause the processor to:
determine at least one of the threshold time value and the threshold cap value as a function of a resource attribute that is selected from the group consisting of a total number of the members, a frequency of permission requests by the members, a total number of requests for rebuilding the selected user profile data sets that are queued for processing, a total amount of available bandwidth, and a cost value for rebuilding the total number of requests queued for processing;
select the one of the user profile data sets in response to reading an index cache entry that stores unique identifiers for each of the members for which the user profile data sets are cached within the repository, wherein a unique identifier of the organization is part of an index key;
build the index cache entry via an offline process that runs periodically to scan an entirety of a cache within the repository; and
execute via an application programming interface call at least one of populating the invalidated value and the first timestamp within the user profile data sets cached in the data repository, selecting one of the user profile data sets in response to determining that the selected user profile data set comprises the invalidated value, and rebuilding the selected user profile data set.

* * * * *